US010177673B2

(12) United States Patent
Xu et al.

(10) Patent No.: US 10,177,673 B2
(45) Date of Patent: Jan. 8, 2019

(54) LLC RESONANT FREQUENCY AUTO DETECTION

(71) Applicant: Texas Instruments Incorporated, Dallas, TX (US)

(72) Inventors: Shanguang Xu, Plano, TX (US); Yitzhak Bolurian, Dallas, TX (US); Vaibhav Ramakant Desai, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/803,188

(22) Filed: Nov. 3, 2017

(65) Prior Publication Data

US 2018/0198375 A1    Jul. 12, 2018

Related U.S. Application Data

(60) Provisional application No. 62/445,014, filed on Jan. 11, 2017.

(51) Int. Cl.
| | |
|---|---|
| *H02M 1/14* | (2006.01) |
| *H02M 5/16* | (2006.01) |
| *H02M 3/337* | (2006.01) |
| *H02M 3/335* | (2006.01) |
| H02M 7/5387 | (2007.01) |
| H02M 1/00 | (2006.01) |

(52) U.S. Cl.
CPC ........... *H02M 5/16* (2013.01); *H02M 3/3376* (2013.01); *H02M 3/33507* (2013.01); *H02M 3/33515* (2013.01); *H02M 3/33592* (2013.01); *H02M 2001/0058* (2013.01); *H02M 2007/53878* (2013.01)

(58) Field of Classification Search
CPC ........... H02M 2001/0058; H02M 1/14; H02M 3/33515; H02M 2007/4815
USPC ..................... 363/21.01–21.03, 21.05, 21.06, 363/21.09–21.11, 45, 46, 78, 79
See application file for complete search history.

(56) References Cited

U.S. PATENT DOCUMENTS

| | | | |
|---|---|---|---|
| 2009/0213623 A1* | 8/2009 | Yang ................. | H02M 3/33507 363/49 |
| 2010/0027298 A1* | 2/2010 | Cohen ............... | H02M 3/33592 363/21.14 |
| 2014/0376272 A1* | 12/2014 | Miao ................. | H02M 3/33592 363/21.02 |

* cited by examiner

*Primary Examiner* — Gary Nash
(74) *Attorney, Agent, or Firm* — Tuenlap D. Chan; Charles A. Brill; Frank D. Cimino

(57) ABSTRACT

Generally speaking, a timing circuit helps determine diode conduction time of an LLC converter. In some examples, the circuit includes an LLC converter having a secondary side and a timing circuit, the timing circuit coupled to the LLC converter on the secondary side. The timing circuit includes a first branch, second branch, gate, and microprocessor. The gate is configured to receive an output of the first branch's comparator and a blanking signal from the second branch. The microprocessor is configured to receive, from the gate, a signal and determine, based at least in part on the signal, a diode conduction time for the LLC converter.

18 Claims, 4 Drawing Sheets

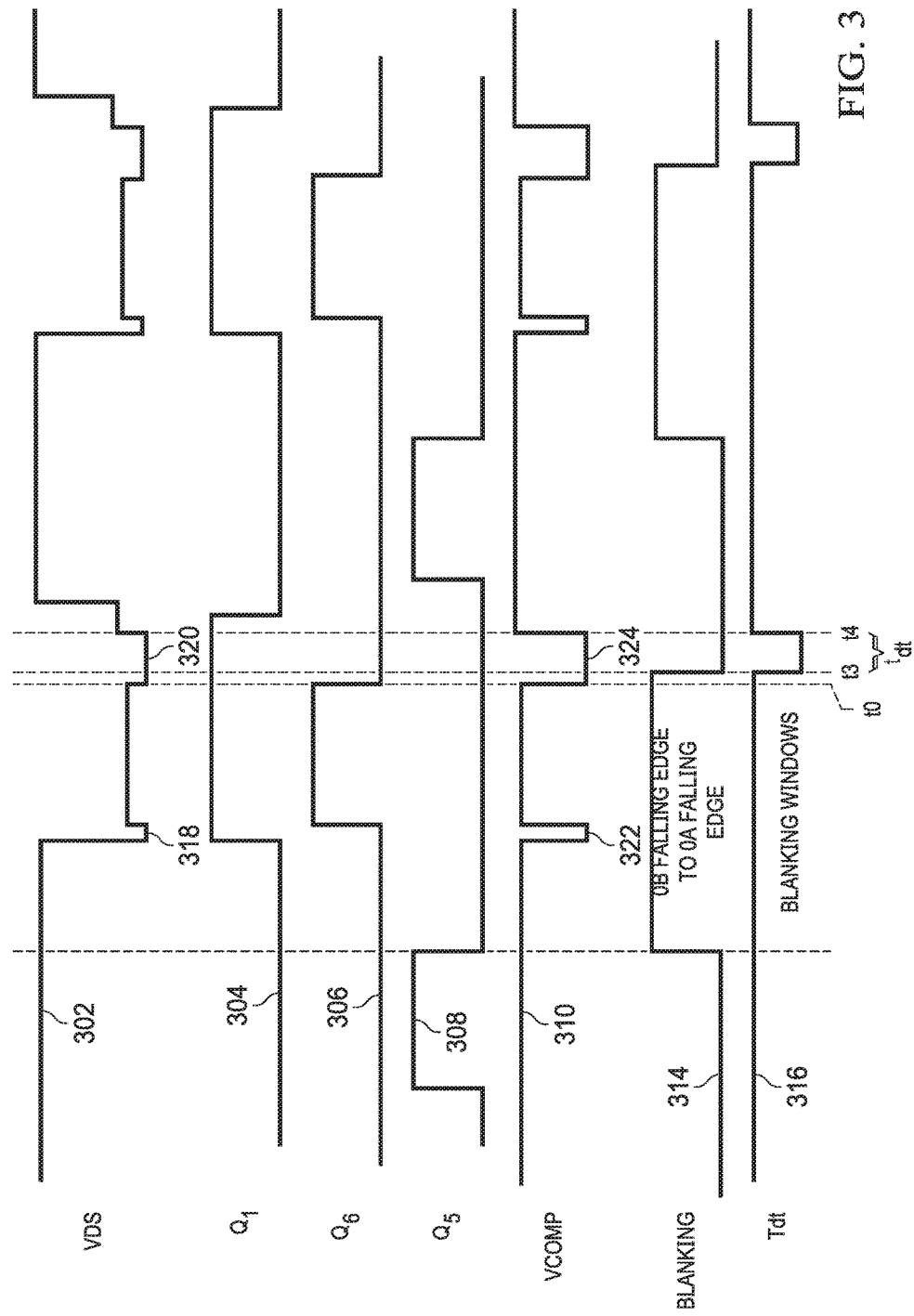

LLC RESONANT FREQUENCY AUTO DETECTION

RELATED APPLICATION(S)

This application claims the benefit of U.S. Provisional application No. 62/445,014, filed Jan. 11, 2017, which is incorporated by reference in its entirety herein.

FIELD OF THE INVENTION

This invention relates generally to LLC converters and, more particularly, to driving LLC converters at their resonant frequency.

BACKGROUND OF THE INVENTION

LLC converters are most efficient when operating at their resonant frequency. Small deviations in the switching frequency of an LLC converter can have significant impacts on its efficiency. Consequently, maintaining operation of an LLC converter at, or close to, its resonant frequency is important in maintaining an efficient system. The resonant frequency of an LLC converter is dependent upon the components of the LLC converter (e.g., the inductors, capacitors, etc.). Due to manufacturing tolerances, LLC converters having the same components may have different resonant frequencies. That is, the components may vary from LLC converter to LLC converter resulting in different resonant frequencies for each LLC converter. For example, the manufacturing tolerance for an inductor may be 20%. Consequently, even though the same inductor is used in each LLC converter, the inductance of the inductors may vary from LLC converter to LLC converter. Because of these manufacturing tolerances, the resonant frequency can vary from LLC converter to LLC converter.

While operating an LLC converter at a switching frequency higher than the resonant frequency results in inefficiencies, operating an LLC converter at a switching frequency lower than the resonant frequency can result not only in inefficient operation but also damage to the LLC converter. Specifically, if the on-time of the switches on the secondary side of the LLC converter is too long, current can flow in a backwards direction in the LLC converter. Because damage can result to the LLC converter if the on-time of switches on the secondary side is too long (i.e., the switching frequency is shorter than that required by the resonant frequency), LLC converters are configured to utilize a conservative maximum on-time. That is, regardless of the qualities of the components used in each LLC converter, each LLC converter will have the same maximum on-time for the switches on the secondary side to ensure that the on-time of the secondary side switches is not so long as to risk damaging the LLC converter.

While this conservative on-time can prevent damage to the LLC converter, it introduces potential inefficiencies. For example, if the components of a specific LLC converter result in a longer resonant period than the conservative maximum on-time estimate, the on-time of the switches on the secondary side is too short resulting in diode conduction time and power losses (i.e., inefficiencies). Consequently, a need exists for a circuit that is capable of measuring body diode conduction time, adjusting the maximum on-time of the secondary side switches, and calculating the resonant frequency to optimize the LLC converter efficiency.

SUMMARY

Described herein are systems, methods, and apparatuses that seek to eliminate, or at least minimize, power losses due to too short an on-time for the switches on the secondary side. In some embodiments, a circuit including an LLC converter includes a microprocessor. The microprocessor is located on the secondary side of the LLC converter and monitors the on-time of one or more of the switches on the secondary side. In some embodiments, the microprocessor monitors a voltage from one of the switches on the secondary side. For example, the microprocessor can monitor the drain voltage of a transistor. In such examples, when the drain voltage of the transistor is below a threshold, it indicates that diode conduction is occurring. Diode conduction is a power loss that contributes to inefficiencies of an LLC converter. The microprocessor can monitor this diode conduction time and adjust the maximum on-time for the transistor. For example, in some embodiments, the microprocessor causes the maximum on-time to be changed by adjusting registers. In some examples, the microprocessor can also transmit information to a controller on the primary side of the LLC converter. The controller on the primary side of the LLC converter adjusts the input voltage on the primary side of the LLC converter to compensate for this new on-time. Not only does this circuit improve the efficiency of the LLC converter by operating the LLC converter at, or near, its resonant frequency, but in some examples, it can also be used in concert with any controller so that such a system can be controller-agnostic.

BRIEF DESCRIPTION OF THE DRAWINGS

Embodiments of the inventive subject matter are illustrated in the figures of the accompanying drawings in which:

FIG. 3 is a chart 300 including waveforms associated with components of an LLC converter, according to some embodiments.

DETAILED DESCRIPTION

Figure 1A:
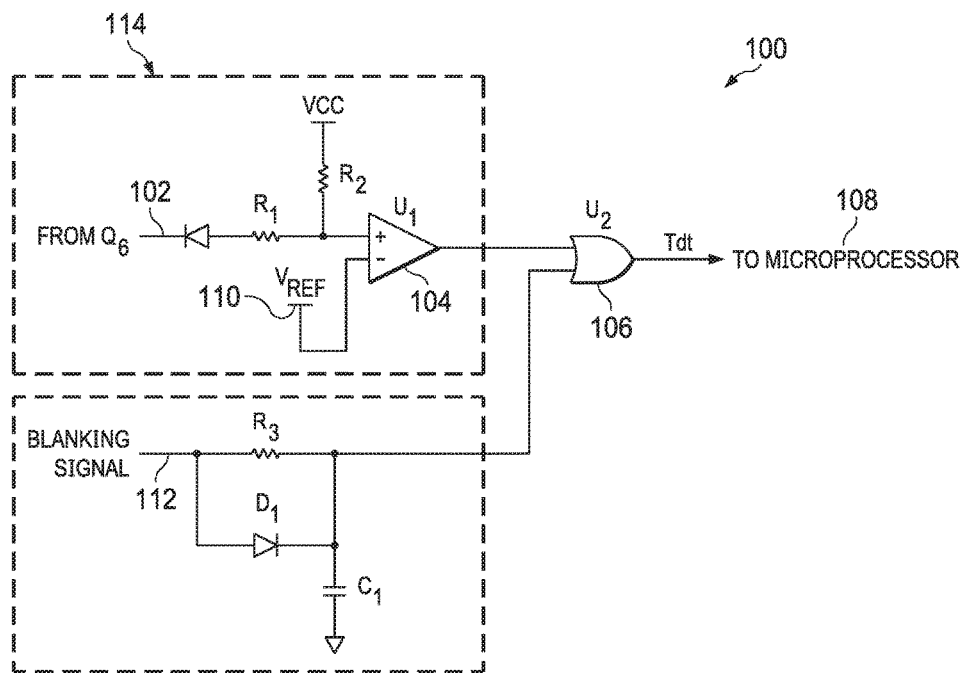
FIG. 1A is a diagram of an example timing circuit 100 for determining diode conduction time of a switch on a secondary side of an LLC converter, according to some embodiments.
Figure 1B:
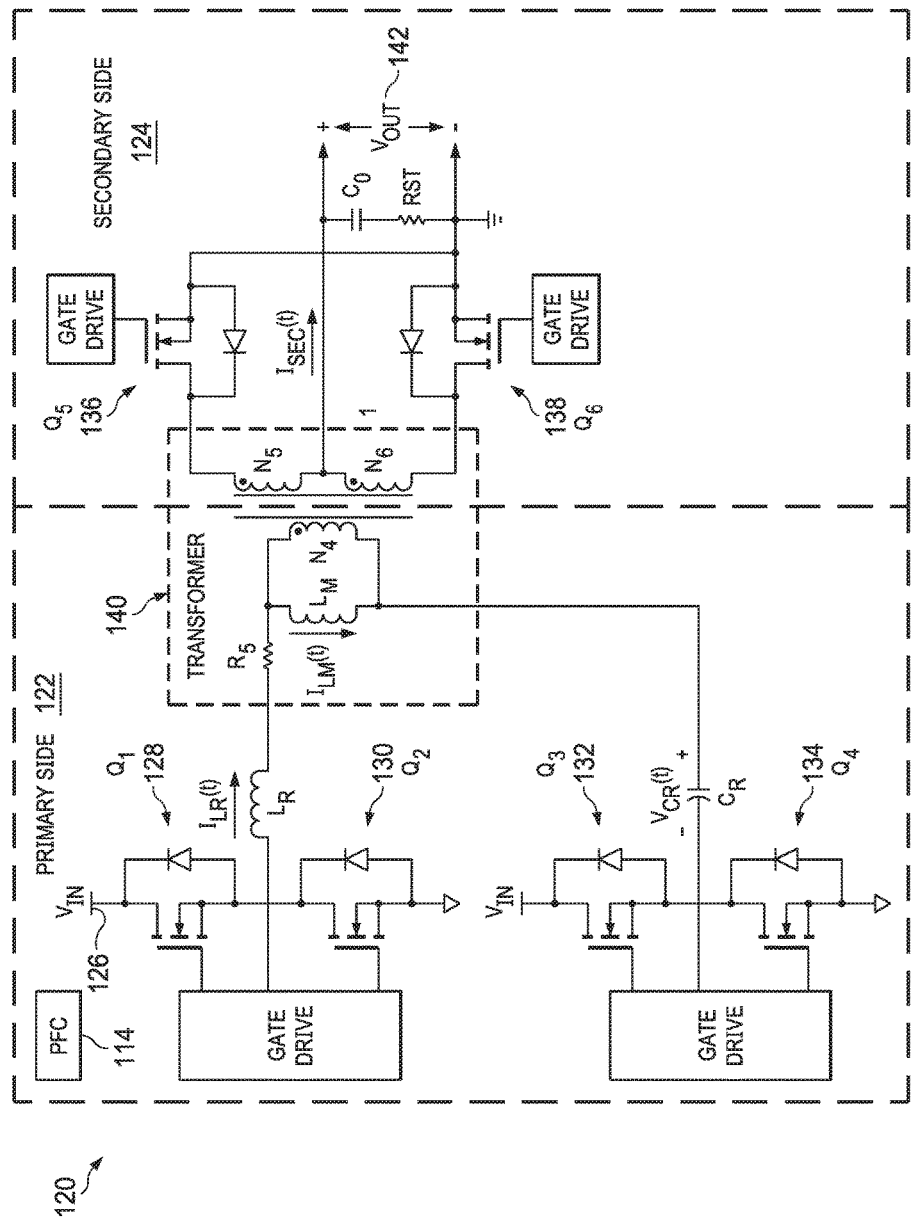
FIG. 1B is a diagram of an example LLC converter 120 with which the example timing circuit 100 of FIG. 1A can be used, according to some embodiments.

Referring now to the figures, FIG. 1A is a diagram of an example timing circuit 100 for measuring diode conduction time of a switch on a secondary side of an LLC converter. In some forms, as shown in FIG. 1A, the timing circuit 100 includes two branches: a first branch 114 and a second branch 116. The first branch 114 has two inputs: a read input 102 and a control input 110. The read input 102 is a potential difference (i.e., voltage drop) from a switch. In the example timing circuit 100 depicted in FIG. 1A, the read input 102 of the first branch 114 is the voltage from a drain of a transistor (i.e., "from Q6," as depicted in FIG. 1B). As will be discussed in more detail with respect to FIGS. 2 and 3, the read input 102 is used to determine diode conduction of the transistor. The control input 110 is a reference voltage ("$V_{REF}$"). The read input 102 and the control input 110 are received by a comparator 104. The comparator 104 compares the read input 102 and the control input 110. When the read input 102 (i.e., the voltage from the drain of the transistor) is below the control input (i.e., the reference voltage), diode conduction is occurring. The output of the comparator 104 is fed to a microprocessor 108. The microprocessor 108 determines diode conduction time based on the output of the comparator 104.

However, as will be discussed in more detail with respect to FIGS. 2 and 3, in some LLC circuits there is a period in which the read input 102 is lower than the reference voltage 110 that is not used to calculate diode conduction time. In such embodiments, the timing circuit 100 can include the second branch 116. The second branch 116 of the timing circuit 100 is a blanking portion of the timing circuit 100. In the example timing circuit 100 depicted in FIG. 1A, the second branch 116 consists of a resistor, a diode, and a capacitor. The output of the second branch 116 of the timing circuit 100 is a blanking signal 112. The blanking signal prevents the microprocessor 108 from including certain periods from being included in the diode conduction time determination. In examples in which the timing circuit 100 includes the second branch 116, the output of the second branch (i.e., the blanking signal 112) and the output of the comparator are fed into a gate, such as an OR Gate 106. The OR Gate 106 masks the output of the comparator 104 during periods in which the read input is less than the control input 110 that is not used in the determination of diode conduction time. In such embodiments, the output of the OR Gate 106 flows to the microprocessor 108. Put simply, the OR Gate 106 blanks the output of the comparator 104 so that the microprocessor 108 can determine the diode conduction time that occurs after the transistor is switched off.

FIG. 1B is a diagram of an example LLC converter 120 with which the example timing circuit 100 of FIG. 1A can be used. Although the LLC converter 120 depicted in FIG. 1B is full bridge LLC converter, half bridge LLC converters can also be used with the circuit of FIG. 1A.

The LLC converter 120 has a primary side 122 and secondary side 124. The primary side 122 of the LLC converter 120 includes two gate drivers and four switches: a first transistor ($Q_1$) 128, a second transistor ($Q_2$) 130, a third transistor ($Q_3$) 132, and a fourth transistor ($Q_4$) 134. The primary side 122 also includes a power factor correction circuit ("PFC"—not shown) 144 that provides the primary side input 126 ($V_{IN}$). The primary side 122 and the secondary side 124 are separated by a transformer 140. The secondary side includes two switches: a fifth transistor ($Q_5$) 136 and a sixth transistor ($Q_6$) 138. The output ($V_{OUT}$) 142 of the LLC converter 120 is on the secondary side 124.

The timing circuit 100 of FIG. 1A is electrically coupled to the secondary side 124 of the LLC converter 100. Specifically, the read input 102 of the first branch 114 of the timing circuit 100 is the voltage from a drain of a transistor on the secondary side 124 (i.e., the potential difference across the drain and source of the transistor). Although the examples provided herein describe the read input 102 of the first branch 114 of the timing circuit 100 being the drain of the sixth transistor ($Q_6$), in some embodiments, the read input 102 of the first branch 114 of the timing circuit 100 can be the drain of the fifth transistor ($Q_5$). After determining the diode conduction time, the microprocessor 108 adjusts operating parameters of the LLC converter 120. For example, the microprocessor 108 can update registers that restrict (clip) the on-time for the fifth transistor 136 and the sixth transistor 138. Additionally, or alternatively, the microprocessor 108 can transmit an indication of the diode conduction time to the primary side 122 of the LLC converter 120. For example, the microprocessor 108 can transmit the indication of the diode conduction time to the PFC 144. The PFC 144 can then adjust the input ($V_{IN}$) 126 to the LLC converter 100 to compensate for the updated on-time. Dependent upon the embodiment, the indication of the diode conduction time can be a measure of the diode conduction time, an indication of the resonant frequency of the LLC converter, an indication of a voltage to be applied by the PFC 144, or any other suitable indication.

Figure 2:
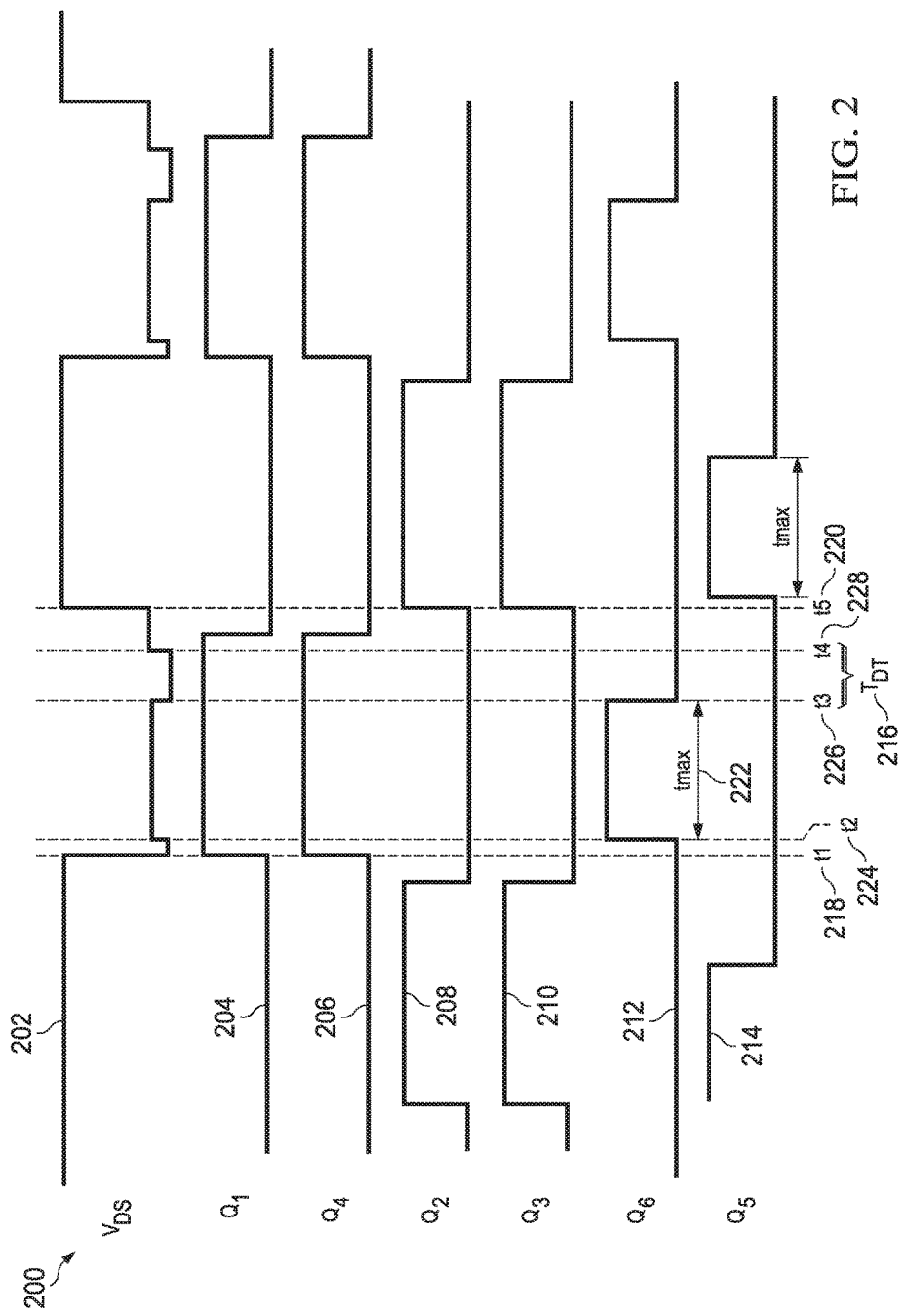
FIG. 2 is a chart 200 including waveforms associated with components of an LLC converter, according to some embodiments.

While the discussion of FIGS. 1A and 1B provide background information regarding a circuit for measuring diode conduction time on a secondary side of an LLC converter, the discussion of FIG. 2 provides additional information regarding switching frequencies and resonant frequencies of an LLC converter used by a microprocessor of such a circuit to determine diode conduction time.

FIG. 2 is a chart 200 including example waveforms associated with components of an LLC converter. The chart 200 includes waveforms for six switches: a waveform for a first transistor ($Q_1$) 204, a waveform for a second transistor ($Q_2$) 208, a waveform for a third transistor ($Q_3$) 210, a waveform for a fourth transistor ($Q_4$) 206, a waveform for a fifth transistor ($Q_5$) 214, and a waveform for a sixth transistor ($Q_6$) 212. These switches align with those depicted in the LLC circuit depicted in FIG. 1B. The first transistor ($Q_1$), the second transistor ($Q_2$), the third transistor ($Q_3$), and the fourth transistor ($Q_4$) 206 are located on the primary side of the LLC converter and are the bridge switches. The fifth transistor ($Q_5$) and the sixth transistor ($Q_6$) are located on the secondary side of the LLC converter and are synchronous switches ("SynchFETs"). The chart 200 also includes an output waveform ($V_{DS}$) 202 depicting the output of the sixth transistor.

As discussed above, due to manufacturing tolerances, LLC converters employing the same components may have different resonant frequencies. To avoid current flowing in a backwards direction through the LLC converter when the SynchFETs (i.e., $Q_5$ and $Q_6$) have too long of an on-time, a maximum on-time ($t_{max}$) 222 is used for the SynchFETs. While the maximum on-time is set as a conservative value that minimizes the possibility of current flowing through the LLC converter in a backwards direction, it is likely shorter than the on-time needed to operate the LLC converter at, or near, its resonant frequency (i.e., half of the resonant period). When the on-time for the SynchFETs is shorter than half of the resonant period, diode conduction occurs.

As indicated by the waveform for the sixth transistor 212, the maximum on-time 222 is the time period between $t_2$ 224 and $t_3$ 226. That is, the on-time for the sixth transistor is restricted such that the sixth transistor cannot be on for a longer time than the time period between $t_2$ 224 and $t_3$ 226. This maximum on-time is less than half of the resonant period. The half resonant period is the time period between $t_2$ 224 and $t_4$ 228. Because the maximum on-time 222 is shorter than the half resonant period, diode conduction occurs after the sixth transistor is turned off. Consequently, diode conduction occurs during the time period between $t_3$ and $t_4$ ($t_{DT}$) 216. This diode conduction can be seen in the output waveform ($V_{Ds}$) 202 where there is a low point between $t_3$ and $t_4$. For the LLC converter to run most efficiently (i.e., at its resonant frequency), diode conduction time should be minimized. That is, $t_{dt}$ 216 (i.e., the time period from $t_3$ to $t_4$) should be minimized. Optimally, the sixth transistor should be on from the $t_2$ to $t_4$ (i.e., a time period equivalent to the sum of the current maximum on-time ($t_{max}$) 222 and the diode conduction time ($t_{dt}$) 216).

The circuit discussed with respect to FIG. 1A can be used to determine diode conduction time and optimally minimize diode conduction time. From the measurement of the diode conduction time, the resonant frequency of the LLC converter can be determined and the LLC converter can be operated at, or near, its resonant frequency. In some examples, the microprocessor of the circuit depicted in FIG. 1A determines the diode conduction time based upon the output of the OR Gate. For example, the microprocessor can use its internal clock to measure the diode conduction time. After determining the diode conduction time, the microprocessor adjusts operating parameters of the LLC converter 120. For example, the microprocessor can update registers that restrict (clip) the on-time for the fifth transistor and the sixth transistor. Additionally, or alternatively, the microprocessor can transmit an indication of the diode conduction time to the PFC. The indication of the diode conduction time can be the diode conduction time or a request to change the input voltage of the LLC converter. If the indication of the diode conduction time is the diode conduction time, the PFC is configured to calculate what new input voltage is necessary for the LLC converter to operate at its resonant frequency while providing the required output (i.e., $V_{OUT}$). In examples in which the indication of the diode conduction time is a request for the PFC to change the input voltage, the microprocessor is configured to calculate what input voltage is necessary for the LLC converter to operate at its resonant frequency while providing the required output (i.e., $V_{OUT}$). In both embodiments, the indication of the diode conduction time causes the PFC to alter the input voltage of the LLC converter in an attempt to operate the LLC converter at its resonant frequency.

In some examples, in addition to the time period between $t_3$ and $t_4$ (i.e., $t_{dt}$) 216, there is a second period of time in which the output voltage ($V_{Ds}$) 202 is low. This occurs during the time period from $t_1$ 218 to $t_2$ 224. During this time period, the bridge switches have been turned on but the associated SynchFET has not yet been turned on (i.e., bridge switches $Q_1$ and $Q_4$ for SynchFET $Q_6$ and bridge switches $Q_2$ and $Q_3$ for SynchFET $Q_5$). This delay between the bridge switches turning on and the SynchFET turning on is less dependent upon the components of the LLC converter and is typically programmed into the operation of the LLC converter. Because this delay is typically programmed into the operation of the LLC converter, it may not be necessary to measure it. As discussed previously, the output of the sixth transistor can be excluded from the microprocessor's determination of the diode conduction time by transmitting a blanking signal during this period (i.e., the time period between $t_1$ 218 and $t_2$ 224). This blanking signal is described in more detail with respect to the waveforms depicted in FIG. 3.

FIG. 3 is a chart 300 including example waveforms associated with components of an LLC converter. The chart 300 includes an output waveform ($V_{Ds}$) 302, a first transistor ($Q_1$) waveform 304, a sixth transistor ($Q_6$) waveform 306, a fifth transistor waveform ($Q_5$), a comparator ($V_{comp}$) waveform 310, and a blanking waveform 314. The output waveform ($V_{Ds}$) 302 represents the output voltage from the drain of the sixth transistor, the comparator waveform ($V_{comp}$) 310 represents the output of the comparator, and the blanking waveform 314 represents the blanking signal.

As can be seen from the output waveform 302, the output of the drain of the sixth transistor goes low at two points: at a first point 318 before the sixth transistor turns on and at a second point 320 after the sixth transistor turns off. During these two points, the output of the drain of the sixth transistor is below the reference voltage. Returning to the discussion of FIG. 1A, the output of the comparator 104 during these two points is the output of the sixth transistor. This can be seen in the comparator waveform 310 at two points: a third point 322 and a fourth point 324. The third point 322 corresponds with the first point 318 (i.e., the comparator output at the third point 322 corresponds to the first low point 318 of the output waveform) and the fourth point 324 corresponds with the second point 320 (i.e., the comparator output at the fourth point 324 corresponds with the second low point of the output waveform 320). In examples that do not include the second branch 116, the microprocessor 108 may use both of these time periods to determine diode conduction time. However, in some examples, the time during the first point 318 where the output of the sixth transistor is low is not used to calculate diode conduction time.

Again, as can be seen from the output waveform 302, the output of the drain of the sixth transistor goes low at two points: at a first point 318 before the sixth transistor turns on and at a second point 320 after the sixth transistor turns off. The first point 318 represents the delay between the time the bridge switches (e.g., $Q_1$ and $Q_4$) are turned on and the SynchFET (e.g., $Q_6$) is turned on. The second point 320 is the time period during which diode conduction is occurring (i.e., between $t_3$ and $t_4$). Because determination of the amount of time in which diode conduction occurs is important, the delay between the time the bridge switches are turned on and the SynchFET is turned on should not be included in the determination of diode conduction time. In some embodiments, the blanking signal is used to prevent this time period (i.e., during the first point 318) from being included in the diode conduction time determination. As can be seen from the blanking waveform 314, the output of the second branch of the example circuit depicted in FIG. 1A is nonzero until the SynchFET (i.e., $Q_6$ in this example) is turned off. The blanking signal 314 is generated from the falling edge of drive signals of the secondary side. In some embodiments, the resistor, diode, and capacitor shown in the example circuit depicted in FIG. 1A delay the falling edge of the signal 314 to block some noise when the SyncFETs are turned off. Consequently, the output of the OR Gate 106 from FIG. 1A is the blanking signal during this time (i.e., the first point 318). Because the output of the OR Gate 106 is the blanking signal during this time (i.e., the first point 318), the microprocessor 108 does not include this time in the determination of the diode conduction time.

Figure 4:
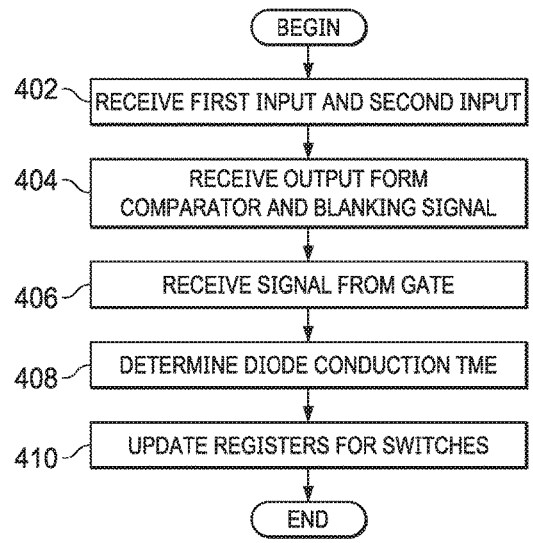
FIG. 4 is a flow chart depicting example operations for adjusting on-time of a switch on a secondary side of an LLC converter, according to some embodiments.

While the discussion of FIGS. 2 and 3 provide additional information about diode conduction with respect to waveforms of components of an LLC converter, the discussion of FIG. 4 provides example operations for adjusting the on-time of the SynchFETs of an LLC converter.

FIG. 4 is a flow chart depicting example operations for adjusting on-time of a switch on a secondary side of an LLC converter. The flow begins at block 402.

At block 402, a first input and a second input are received. For example, a comparator of a timing circuit receives the first input and the second input. The first input can be an output from a switch on a secondary side of an LLC converter. In some examples, the output (i.e., the first input of the comparator) is a potential difference across a source and a drain of a transistor on the secondary side of the LLC converter. The second input is a reference voltage. The comparator generates an output based on the first input and the second input. When the voltage from the transistor is higher than the reference voltage, the comparator outputs a logic high voltage (e.g., the supply voltage of the comparator). When the voltage from the transistor is lower than the reference voltage, the comparator outputs a logic low voltage (e.g., the ground). When the voltage from the transistor is lower than the reference voltage, diode conduction may be occurring. The flow continues at block 404.

At block 404, the output from the comparator and a blanking signal are received. For example, a gate, such as an OR Gate, can receive the output from the comparator and the blanking signal. The blanking signal is used to block, or negate, the output from the comparator. As discussed above, when the voltage from the transistor is lower than the reference voltage, diode conduction may be occurring. However, there may be periods when the voltage from the transistor is lower than the reference voltage that should not be used in the determination of diode conduction time. Specifically, during the time period when the bridge switches are turned on and the SynchFET has not yet turned on, the voltage from the transistor (i.e., the SynchFET) may be below the reference voltage. In some examples, this delay is not used to determine diode conduction time. In such examples, the blanking signal blanks the output of the comparator so that the output of the OR Gate is the blanking signal, and not the output of the comparator. In this way, the blanking signal is present during the delay between the bridge switches turning on and the SynchFET turning on, but not after the SynchFET is turned off. The flow continues at block 406.

At block 406, a signal is received from the gate. For example, a microprocessor can receive the signal from the OR Gate. The signal from the OR Gate is either the blanking signal or the voltage from the transistor. The flow continues at block 408.

At block 408, diode conduction time is determined. For example, the microprocessor can determine the diode conduction time. In some examples, the microprocessor determines diode conduction time based on the signal from the OR Gate. For example, the microprocessor times the duration that the voltage from the transistor is below the reference voltage. That is, the microprocessor times the duration that the voltage from the transistor is below the reference voltage and is not being blanked. In some approaches, the microprocessor times this duration using an internal clock. For example, the microprocessor enters a start point in the register when the signal from the OR Gate is changed to a low level and enters an end point in the register when the signal from the OR Gate is changed to a high level. The microprocessor determines the diode conduction time by subtracting the start point from the end point. In some examples, the microprocessor also estimates the resonant period of the LLC converter based on the diode conduction time. In examples in which a maximum on-time is set for the transistor, the microprocessor can estimate the resonant period of the converter by adding the diode conduction time to the maximum on-time. The sum of the diode conduction time and the maximum on-time is an estimate of half of the resonant period for the LLC converter. The flow continues at block 410.

At block 410, registers for one or more of the switches are updated. For example, the microprocessor can update the registers for the transistors on the secondary side of the LLC converter (i.e., the SynchFETs). In examples in which the transistors are capped at a maximum on-time, the microprocessor updates the registers by adjusting the maximum on-time. The microprocessor adjusts the maximum on-time to be the sum of the previous maximum on-time and the diode conduction time. Additionally, or alternatively, in some approaches, the microprocessor transmits an indication of the diode conduction time to the primary side of the LLC converter. For example, the microprocessor can transmit the indication of the diode conduction time to a PFC on the primary side of the LLC converter. In response, the PFC adjusts the input ($V_{IN}$) of the LLC converter. The PFC adjusts the input of the LLC converter so that the LLC converter can operate at its resonant frequency while providing the required output. The indication of the diode conduction time can be a measure of the diode conduction time, an indication of the resonant frequency of the LLC converter, an indication of a voltage to be applied by the PFC, or any other suitable indication. While the discussion of FIGS. 1-4 provide detail about operation of a circuit for determining diode conduction time of a switch on a secondary side of an LLC converter, the following text is example pseudo-code that can operate on the microprocessor.

Initialize the capture timer peripheral (TCAP) in order to measure a time interval
Capture the time for falling edge of DPWM0A+BLANKING
Capture the time for rising edge of VCOMP
Subtract the two times previously captured to find the time interval between the edges
Calculate the resonant frequency based on the above time interval according to: Resonant frequency=1/(2*(SR clamp time+td+offset))
Configure the PWM outputs in a way that Synchronous Rectifiers (SR) On time is clamped above the resonant frequency and stops growing to avoid reverse current

What is claimed is:

1. A circuit comprising:
an LLC converter having a primary side and a secondary side; and
a timing circuit, the timing circuit coupled to the LLC converter on the secondary side and comprising:
 a first branch, wherein the first branch includes a comparator having a first input and a second input;
 a second branch, wherein the second branch is configured to output a blanking signal;
 a gate, wherein the gate is configured to receive an output of the comparator and the blanking signal; and
 a microprocessor, wherein the microprocessor is configured to:
  receive, from the gate, a signal;
  determine, based, at least in part, on the signal, a diode conduction time for the LLC converter; and
  update, based on the diode conduction time, one or more registers for switches on the secondary side of the LLC converter.

2. The system of claim 1, wherein the first input is configured to receive a voltage at a switch.

3. The system of claim 2, wherein the switch is a transistor on the secondary side of the LLC converter, and wherein the voltage is a potential difference across a drain and a source of the transistor.

4. The system of claim 1, wherein the signal indicates that diode conduction is occurring in the LLC converter.

5. The system of claim 1, wherein the second input is configured to receive a reference voltage.

6. The system of claim 1, wherein the one or more registers clip an on-time of the switches on the secondary side of the LLC converter to a maximum on-time.

7. The system of claim 6, wherein the microprocessor is configured to update the registers to increase the maximum on-time.

8. The system of claim 1, wherein the microprocessor is further configured to:

transmit, to a power factor correction circuit on the primary side of the LLC converter, an indication of the diode conduction time.

9. A method for determining diode conduction time of an LLC converter, the method comprising:
receiving, at a comparator of a timing circuit on a secondary side of the LLC converter, a first input and a second input;
receiving, at a gate, an output from the comparator and a blanking signal;
receiving a signal at a microprocessor from the gate;
determining, based at least in part on the signal, a diode conduction time for the LLC converter; and
updating, by the microprocessor, one or more registers for switches on the secondary side of the LLC converter.

10. The method of claim 9, wherein the receiving the first input comprises receiving a voltage at a switch.

11. The method of claim 10, wherein the receiving the voltage at the switch comprises receiving the voltage at a transistor on the secondary side of the LLC converter, and wherein the voltage is a potential difference across a drain and a source of the transistor.

12. The method of claim 9, wherein the receiving the signal comprises receiving indication that diode conduction is occurring in the LLC converter.

13. The method of claim 9, wherein the receiving the second input comprises receiving a reference voltage.

14. The method of claim 9, further comprising:
updating, based on the diode conduction time, one or more registers for switches on the secondary side of the LLC converter.

15. The method of claim 14, further comprising using the one or more registers to clip an on-time of the switches on the secondary side of the LLC converter to a maximum on-time.

16. The method of claim 15, wherein updating the registers comprises increasing the maximum on-time.

17. The method of claim 9, further comprising:
transmitting, to a power factor correcting circuit on a primary side of the LLC converter, an indication of the diode conduction time.

18. A circuit comprising:
an LLC converter having a primary side and a secondary side; and
a timing circuit, the timing circuit coupled to the LLC converter on the secondary side and comprising:
  a first branch, wherein the first branch includes a comparator having:
    a first input configured to receive a voltage at a transistor on the secondary side of the LLC converter, and wherein the voltage is a potential difference across a drain and a source of the transistor, and
    a second input configured to receive a reference voltage;
  a second branch, wherein the second branch is configured to output a blanking signal;
  a gate, wherein the gate is configured to receive an output of the comparator and the blanking signal; and
  a microprocessor, wherein the microprocessor is configured to:
    receive, from the gate, a signal that indicates diode conduction is occurring in the LLC converter;
    determine, based, at least in part, on the signal, a diode conduction time for the LLC converter;
    update, based on the diode conduction time, one or more registers for switches on the secondary side of the LLC converter, the one or more registers configured to effect clipping an on-time of the switches on the secondary side of the LLC converter to a maximum on-time.

* * * * *